United States Patent
Kolvick et al.

(10) Patent No.: US 10,273,814 B2
(45) Date of Patent: Apr. 30, 2019

(54) TOOL AND METHOD FOR INSTALLING TURBOMACHINE COMPONENT

(71) Applicant: General Electric Company, Schenectady, NY (US)

(72) Inventors: Sandra Beverly Kolvick, Simpsonville, SC (US); Jean-Philippe Guillard, Cravanche (FR); James Bradford Holmes, Fountain Inn, SC (US); Wayne David Sullivan, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 253 days.

(21) Appl. No.: 14/988,223

(22) Filed: Jan. 5, 2016

(65) Prior Publication Data
US 2017/0191380 A1    Jul. 6, 2017

(51) Int. Cl.
| | |
|---|---|
| *F01D 5/30* | (2006.01) |
| *B23P 19/02* | (2006.01) |
| *B23P 19/04* | (2006.01) |
| *F01D 11/00* | (2006.01) |
| *F01D 25/28* | (2006.01) |

(52) U.S. Cl.
CPC .......... *F01D 5/3007* (2013.01); *F01D 11/008* (2013.01); *F01D 25/285* (2013.01); *B23P 19/02* (2013.01); *B23P 19/04* (2013.01); *F05D 2230/68* (2013.01); *Y02T 50/671* (2013.01)

(58) Field of Classification Search
CPC ...... F01D 25/28; F01D 5/3007; F01D 11/001; B25P 19/04; B25P 19/02

USPC ............................................ 81/484, 488, 44
See application file for complete search history.

(56) References Cited

U.S. PATENT DOCUMENTS

| | | |
|---|---|---|
| 3,673,668 A | 7/1972 | Crook |
| 4,078,290 A | 3/1978 | Fletcher et al. |
| 4,096,614 A | 6/1978 | Brungard et al. |
| 4,334,493 A | 6/1982 | Okawara |
| 4,335,493 A | 6/1982 | Shivers et al. |
| 5,181,440 A * | 1/1993 | Jagt ..................... B25B 27/0035 188/1.11 R |
| 6,571,471 B2 | 6/2003 | Hohmann |
| 7,455,505 B2 | 11/2008 | Hartmann et al. |

(Continued)

OTHER PUBLICATIONS

Extended European Search Report and Opinion issued in connection with corresponding EP application No. 17162084.2 dated Aug. 17, 2017.

(Continued)

*Primary Examiner* — Christopher J Besler
(74) *Attorney, Agent, or Firm* — Ernest G. Cusick; Hoffman Warnick LLC

(57) ABSTRACT

A tool for installing a turbomachine component in a first dovetail slot of a first component mount is provided. The tool may include a tool mount having a body for selective fixing in a second dovetail slot of a second component mount adjacent to the first component mount. The tool may also include a lever arm including a first portion, an intermediate pivot for pivotally engaging the tool mount, and a second portion for engaging the turbine component. Actuating the lever arm against the tool mount causes the second portion of the lever arm to install the turbomachine component into the first dovetail slot of the first component.

17 Claims, 10 Drawing Sheets

(56) References Cited

U.S. PATENT DOCUMENTS

| | | |
|---|---|---|
| 8,117,727 B2 | 2/2012 | McCarvill |
| 8,864,453 B2 | 10/2014 | Spracher et al. |
| 2009/0265908 A1 | 10/2009 | Corn et al. |
| 2010/0162546 A1 | 7/2010 | Kalmar et al. |
| 2015/0218948 A1 | 8/2015 | Bird |
| 2015/0260043 A1 | 9/2015 | Holmes et al. |
| 2015/0328729 A1 | 11/2015 | Holmes et al. |
| 2017/0274510 A1 | 9/2017 | Kolvick et al. |

OTHER PUBLICATIONS

Non-final Office Action dated Jun. 14, 2018 for U.S. Appl. No. 15/082,151, filed Mar. 28, 2016; pp. 24.
Final Office Action dated Oct. 15, 2018 for U.S. Appl. No. 15/082,151, filed Mar. 28, 2016; pp. 15.
Notice of Allowance dated Feb. 6, 2019 for U.S. Appl. No. 15/082,151, filed Mar. 28, 2016; pp. 8.

* cited by examiner

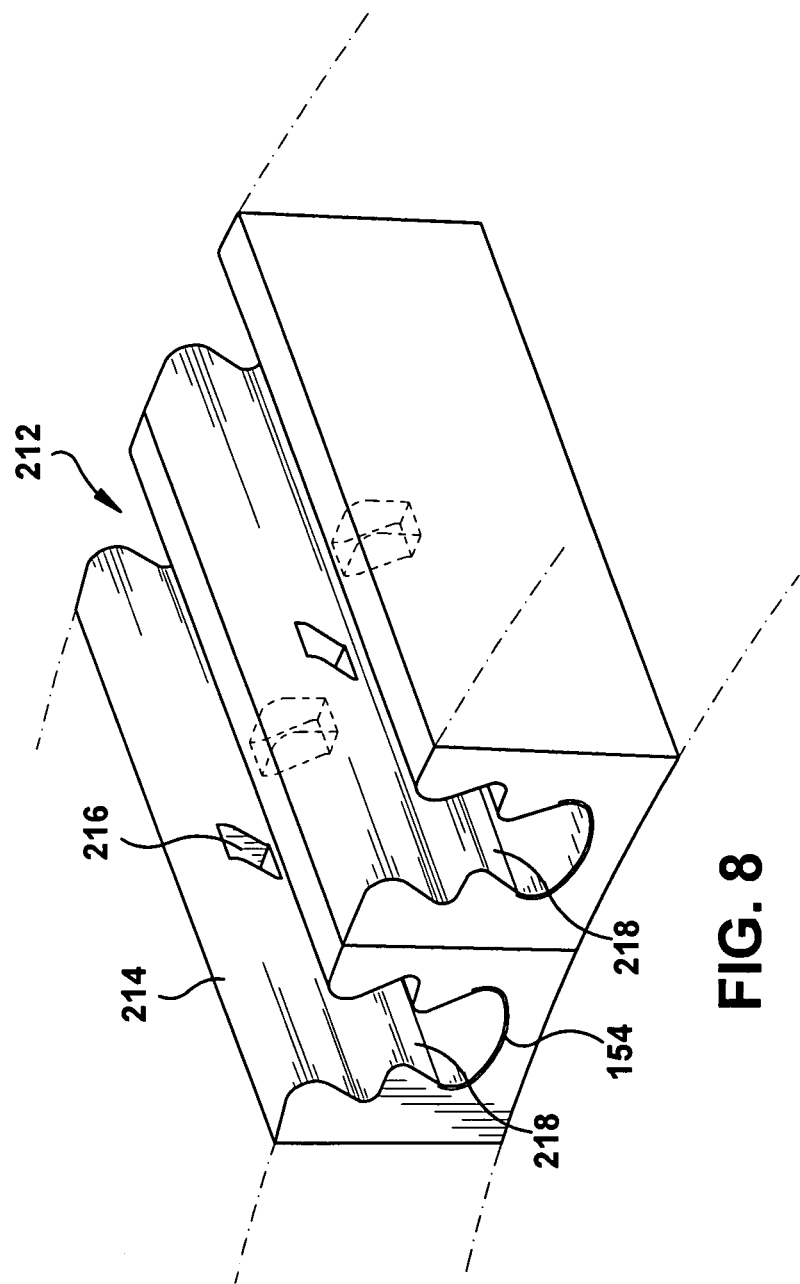

TOOL AND METHOD FOR INSTALLING TURBOMACHINE COMPONENT

BACKGROUND OF THE INVENTION

The disclosure relates generally to turbomachines, and more particularly, to a tool and related method for installing a turbomachine component such as near flow path seal (NFPS) member in a dovetail slot of a component mount.

Turbomachines include a large number of components that are mounted on various component mounts in the machine. Installation of turbomachine components can be difficult task because installation of components can require positioning of heavy, intricate parts into small areas and then manipulating those parts to install them. The task can be difficult in ideal situations such as a manufacturing floor, and even more difficult when conducted in the field. One example turbomachine component that poses challenges for installation is a near flow path seal (NFPS) member. Each NFPS member includes a seal member that is coupled to a dovetail for mounting in a dovetail slot of a seal member rotor wheel. A large number of NFPS members are mounted about the seal member rotor wheel adjacent another rotor wheel that carries rotating blades. Each dovetail slot in the seal member rotor wheel may include a C-shaped seal in the root for sealing the slot that necessitates applying a high force to the NFPS member to install it into the dovetail slot. The force is typically applied at the root (dovetail) or on the seal member of the NFPS member and applied gently but firmly in order to have the proper alignment of the seal during installation and later operation. Conventionally, this installation process requires using rubber hammers, wedges, and other rudimentary tools on the dovetail or the seal member of the NFPS member. The tight space between parts also increases the amount of time required for the installation.

BRIEF DESCRIPTION OF THE INVENTION

A first aspect of the disclosure provides a tool for installing a turbomachine component in a first dovetail slot of a first component mount, the tool comprising: a tool mount having a body for selective fixing in a second dovetail slot of a second component mount adjacent to the first component mount; and a lever arm including a first portion, an intermediate pivot for pivotally engaging the tool mount, and a second portion for engaging the turbine component, wherein actuating the lever arm against the tool mount causes the second portion of the lever arm to install the turbomachine component into the first dovetail slot of the first component mount.

A second aspect of the disclosure provides a tool for installing a near flow path seal (NFPS) member in a first dovetail slot of a first rotor wheel, the tool comprising: a tool mount having a body for selective fixing in a second dovetail slot of a second rotor wheel adjacent to the first rotor wheel; and a lever arm including a first portion, an intermediate pivot for pivotally engaging the tool mount, and a second portion for engaging the turbine component, wherein actuating the lever arm against the tool mount causes the second portion of the lever arm to install the NFPS member into the first dovetail slot of the first rotor wheel.

A third aspect of the disclosure provides a method of installing a turbomachine component in a first dovetail slot of a first component mount, the method comprising: partially positioning the turbomachine component in the first dovetail slot; affixing a tool mount having a body in a second dovetail slot of a second component mount adjacent to the first component mount; pivotally engaging a lever arm with the tool mount, the lever arm including a first portion, an intermediate pivot pivotally engaging the tool mount, and a second portion engaging the turbine component; and actuating the lever arm against the tool mount causing the second portion of the lever arm to install the turbomachine component into the first dovetail slot of the first component mount.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 8 shows a perspective view of a dovetail slot in which a tool mount of the tool of FIG. 5 may be affixed.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a tool for installing a turbomachine component and related method.

Figure 1:
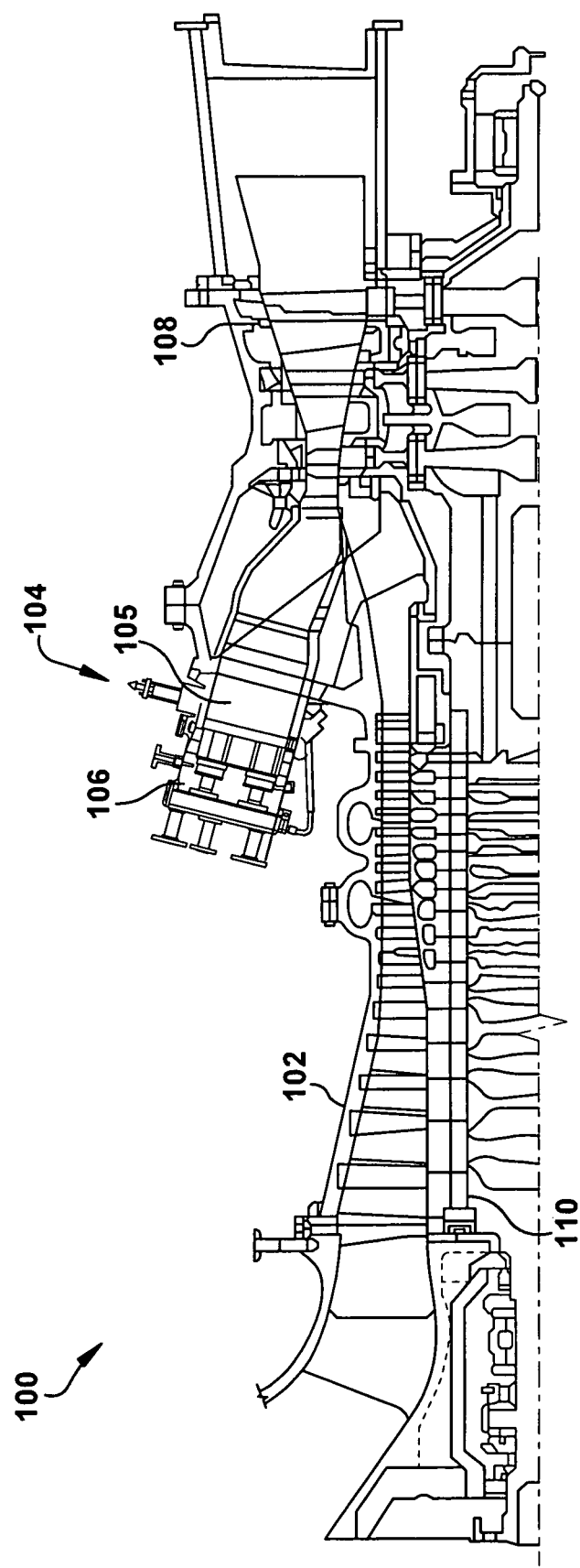
FIG. 1 shows a cross-section of an illustrative turbomachine in the form of a conventional gas turbine.

FIG. 1 is a schematic illustration of an illustrative turbomachine in the form of a gas turbine system 100. System 100 includes a compressor 102 and a combustor 104. Combustor 104 includes a combustion region 105 and a fuel nozzle assembly 106. System 100 also includes a turbine 108 and a common compressor/turbine shaft 110 (sometimes referred to as rotor 110). In one embodiment, system 100 is a 7F model engine with an S1B tech package, commercially available from General Electric Company, Greenville, S.C. Embodiments of the disclosure are not limited to any one particular gas turbine engine, and may be implanted in connection with other engines including, for example, the 9HA engine models of General Electric Company. Furthermore, teachings of the disclosure are not limited to gas turbines, and may be applied to any variety of turbomachine such as steam turbines, jet engines, compressors, etc. As used herein, the terms "axial", "radial" and "circumferential" are used with rotor 110 as the reference structure.

In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 for which gas stream thermal energy is converted to mechanical rotational energy. Turbine 108 is rotatably coupled to and drives rotor 110. Compressor 102 also is rotatably coupled to shaft 110. In the illustrative embodiment, there is a plurality of combustors 104 and fuel nozzle assemblies 106.

Figure 2:
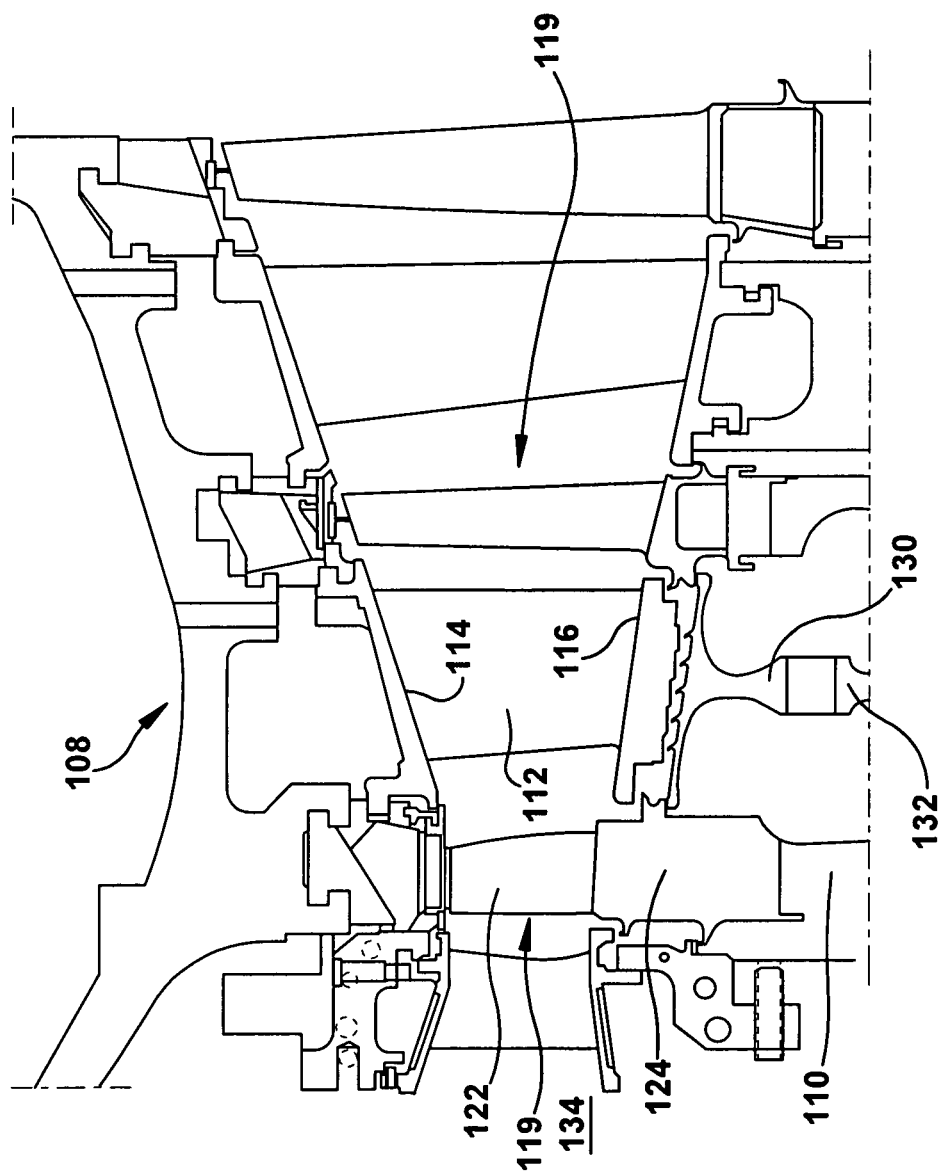
FIG. 2 shows a cross-section of a portion of the gas turbine of FIG. 1.

FIG. 2 is cross-section illustration of an illustrative turbine assembly 108 with a three stage nozzle that may be used with gas turbine system 100 in FIG. 1. Turbine assembly 108 includes a nozzle sub-assembly 112. Nozzle sub-assembly 112 is held in the turbine assembly 108 by a radially outer platform 114 and a radially inner platform 116 and includes a nozzle vane airfoil therebetween. Turbine assembly 108 also includes a rotating blade or bucket 119, which may include an airfoil 122 held to rotor 110 by a shank 124. Turbomachine 100 is also shown to include a plurality of near flow path seal members one of which is indicated at 130 arranged between buckets 119 and below radially inner platform 116 of nozzle 112. Buckets and near flow path seal (NFPS) members 130 are mounted to shaft 110 through respective rotor wheels, e.g., for NFPS members, a seal member rotor wheel 132.

Turning to the enlarged view of FIG. 3, for purposes of description, a turbomachine component to which a tool 200 (FIGS. 5-7) according to embodiments of the disclosure can be applied will be described relative to NFPS member 130 and a component mount as a respective seal member rotor wheel 132. It is emphasized and as will be understood by those skilled in the art, the teachings of the disclosure are applicable to practically any turbomachine component such as but not limited to turbomachine blades, nozzles, etc., that include a dovetail connection and must be axially mated with a dovetail slot in a component mount such as a casing, rotor wheel, etc.

Figure 3:
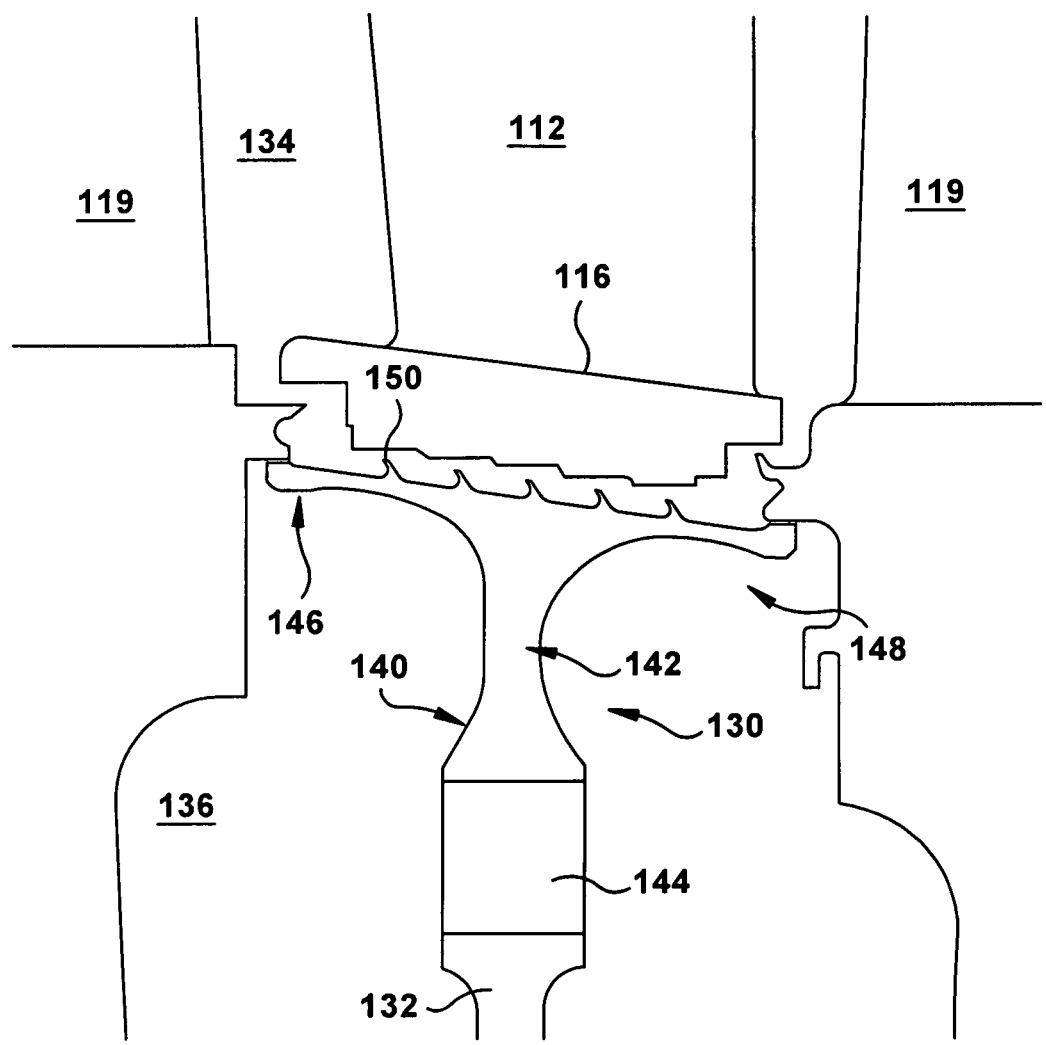
FIG. 3 shows a cross-section of an illustrative turbomachine component in the form of an NFPS member installed in the turbomachine.
Figure 4:
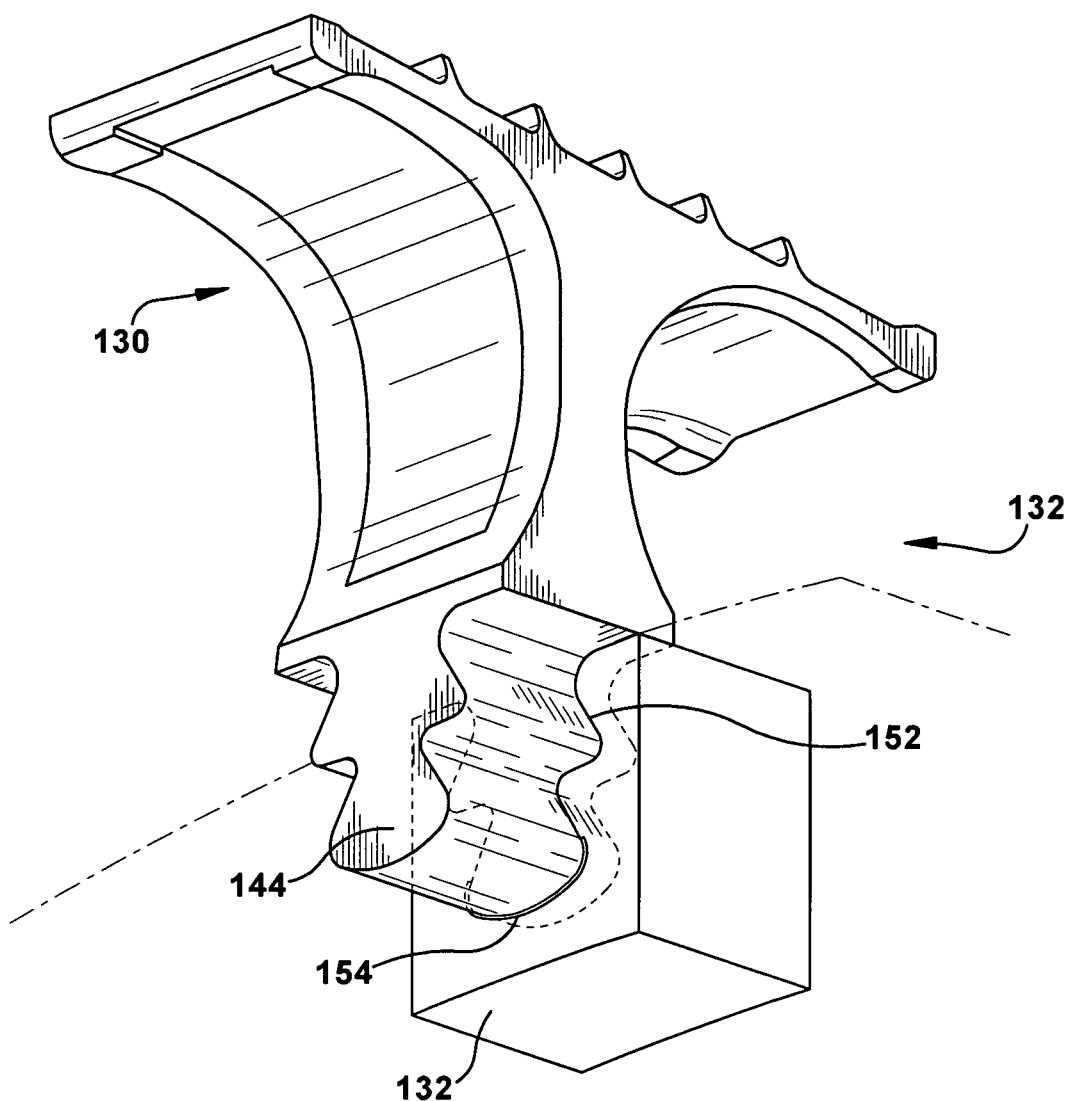
FIG. 4 shows a perspective view of the NFPS member of FIG. 3 partially installed on a seal member rotor wheel.

Continuing with FIG. 3, NFPS members 130 are configured to prevent an exchange of gases between gas path 134 and a wheel space 136 of turbomachine 100 (FIG. 1). At this point it should be understood that turbomachine 100 (FIG. 1) includes additional NFPS members (not shown) arranged between adjacent stages (also not shown) of turbine assembly. It is emphasized that NFPS members 130 may take a variety of forms other than as described in the illustrative embodiment herein, see e.g., U.S. Pat. No. 8,864,453. NFPS member 130 may include a seal body 140 having a seal support member 142. A dovetail 144 is provided at a radially inner end portion of seal support member 142. Dovetail 144 provides an interface between NFPS member 130 and seal member rotor wheel 132. In particular, dovetail 144 slides axially (sideways in FIG. 3) into a dovetail slot (not shown) of seal member rotor wheel 132. NFPS member 130 may also include a first arm member 146 that is cantilevered from a radially outermost end of seal support member 142. First arm member 146 includes a first portion that extends to a second portion that defines an axial dimension, and first and second opposing edges (only one edge shown) that define a circumferential dimension. NFPS member 130 also includes a second arm member 148 that is cantilevered from radial outermost end of seal support member 142. Similar to first arm member 146, second arm member 148 includes a first portion that extends to a second portion that defines an axial dimension, and first and second opposing edges that define a circumferential dimension. Arm members 146, 148 may be radially angled to match that of radial inner platform 116. A plurality of seal teeth 150 extend radially from members 146, 148 to seal with platform 116. FIG. 4 shows NFPS member 130 in position to be mounted to seal member rotor wheel 132. As shown in FIG. 4, dovetail 152 of rotor wheel 132 may include a C-shaped seal 154 therein, which acts to seal NFPS member 130, but also inhibits easy sliding installation of NFPS member 130.

Figure 5:
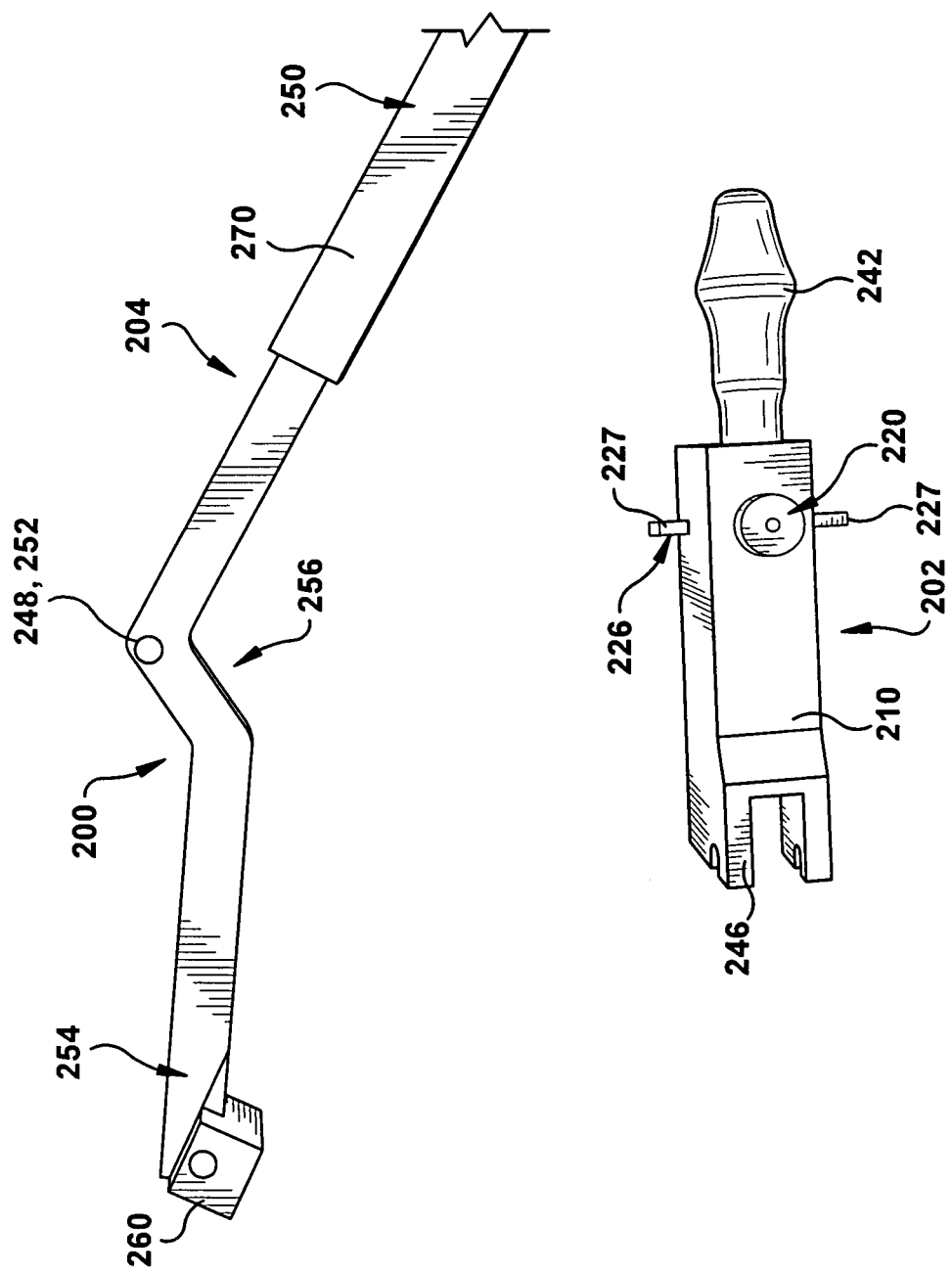
FIG. 5 shows an exploded side view of a tool according to embodiments of the disclosure.
Figure 6:
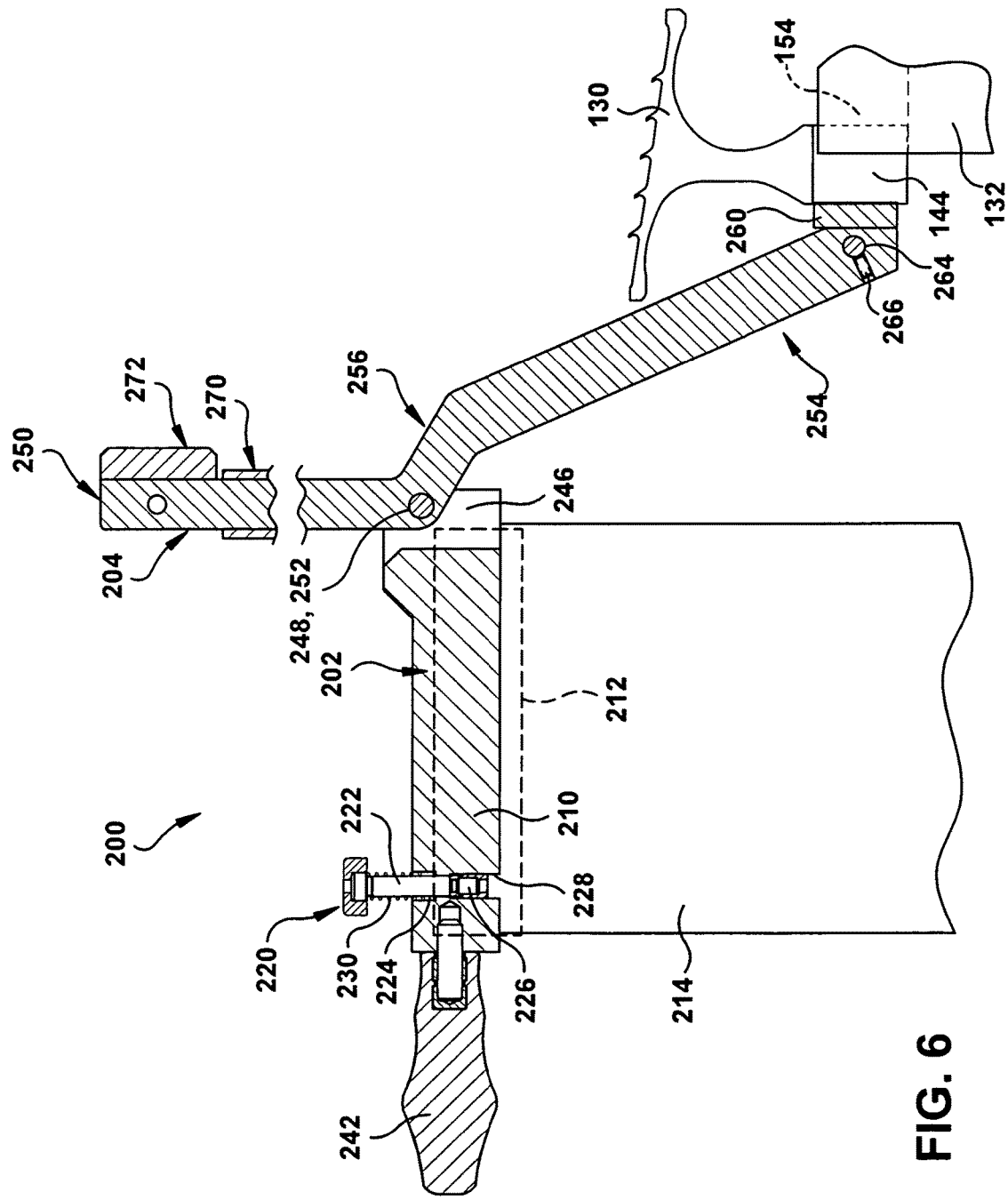
FIG. 6 shows a cross-sectional view of the tool of FIG. 5 in operation according to embodiments of the disclosure.
Figure 7:
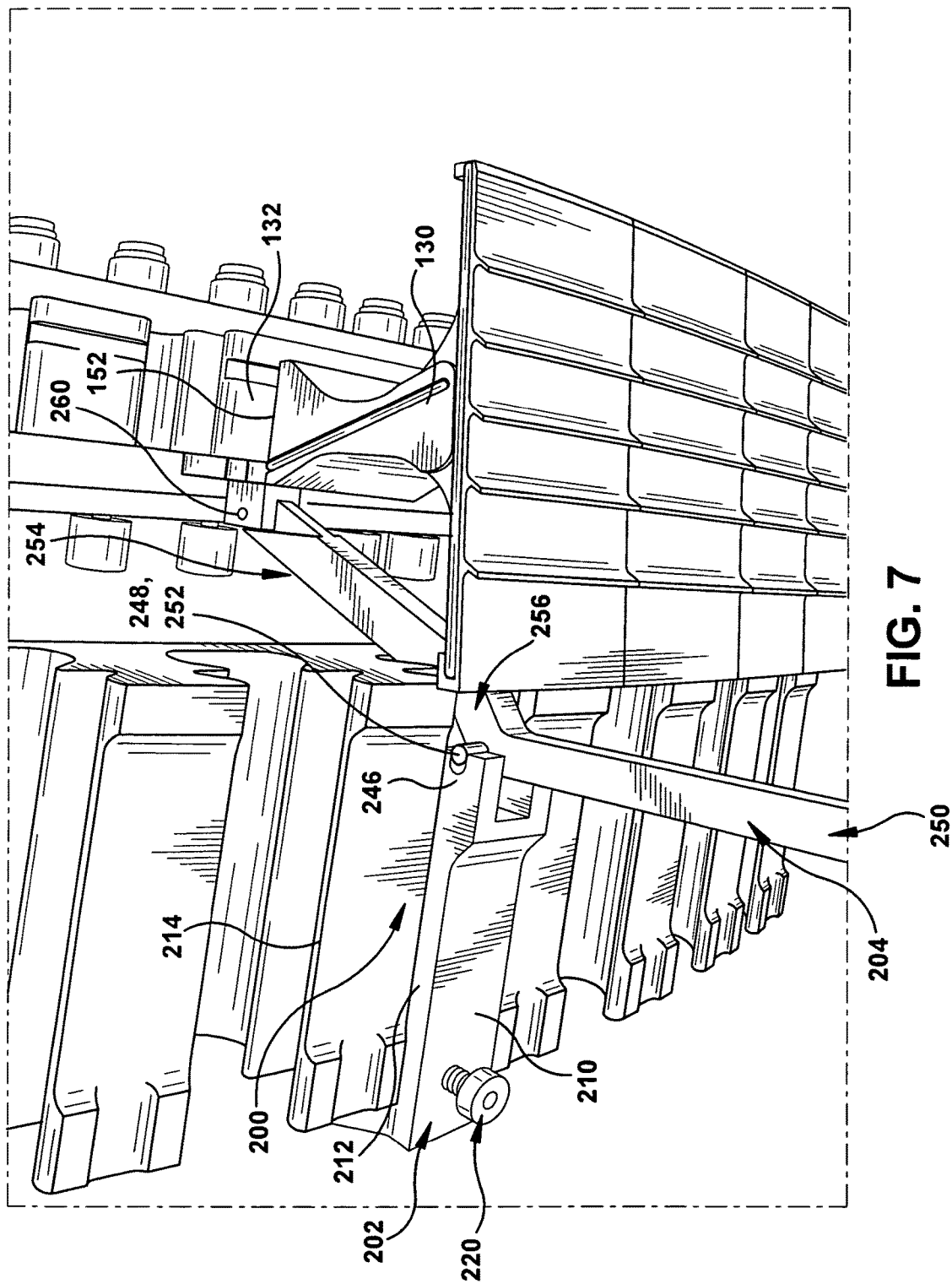
FIG. 7 shows a perspective view of the tool of FIG. 5 in operation according to embodiments of the disclosure.

Referring to FIGS. 5-7, a tool 200 for installing a turbomachine component such as NFPS member 130 in dovetail slot 152 (FIG. 4) of a component mount (e.g., rotor wheel) 132 will now be described. FIG. 5 shows an exploded perspective view, and FIGS. 6 and 7 show a cross-sectional and a perspective view, respectively, of the tool in an operative state. Generally, tool 200 includes a tool mount 202 and a lever arm 204. As will be described herein, tool mount 202 is selectively fixed relative to where NFPS member 130 is to be installed, and lever arm 204 can pivot on tool mount 202 in order to force dovetail 144 of NFPS member 130 into a dovetail 152 of seal member rotor wheel 132. That is, actuating lever arm 204 against tool mount 202 causes the lever arm to install NFPS member 130 (turbomachine component) into dovetail slot 152 of rotor wheel 132 (component mount). Tool 200 thus alleviates the use of rudimentary tools and allows for easy, quick installation of turbomachine components such as NFPS member 130.

Continuing with FIGS. 5-7, tool mount 204 may include a body 210 for selective fixing in a dovetail slot 212 (FIGS. 6-7) of a component mount 214 (FIGS. 6-7) axially adjacent to component mount 132 (FIGS. 6-7) for NFPS member 130 (FIGS. 6-7). As shown in FIG. 8, a component mount that receives tool mount 202 may include, for example, for the example NFPS members, a first stage blade rotor wheel (hereinafter mount rotor wheel 214) adjacent to seal member rotor wheel 132. During operation of turbomachine 100, mount rotor wheel 214 may be for mounting a rotating blade (not shown) that includes a dovetail that mounts to dovetail slot 212 of mount rotor wheel 214. As shown in one example in FIG. 8, dovetail slot 212 may include a portion 216 of an interior surface 218 that is capable of engagement by a lock member 226 of tool mount 202 to temporarily axially fix body 210 of tool mount. In the example shown, portion 216 may include radially extending grooves such as cover plate coupling grooves. It is emphasized, however, that portion 216 could take a variety of alternative forms. As shown best in FIG. 9, body 210 has a cross-section configured to mate with at least a portion of dovetail slot 212. For example, body 210 may have at least a portion that has a dovetail shape that mates with one or more dovetail grooves in dovetail slot 212. In this fashion, body 210 can be slid into dovetail slot 212 from either open end thereof.

Figure 10:
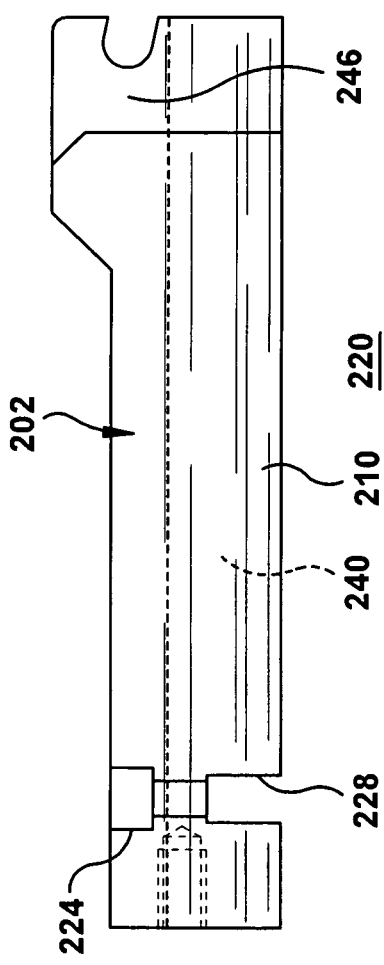
FIG. 10 shows an enlarged side view of a tool mount of the tool of FIGS. 5-7.
Figure 11:
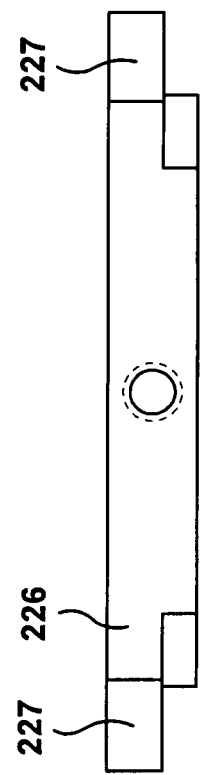
FIG. 11 shows an enlarged plan view of a lock member of the tool of FIGS. 5-7.

Tool mount 202 may further include a spring-loaded lock 220 configured to engage portion 216 of interior surface 218 of dovetail slot 212 to temporarily fix a position of tool mount 202 to dovetail slot 212. That is, tool mount 202 is axially fixed (relative to rotor 110 (FIG. 1)). Spring-loaded lock 220 may take a variety of forms. In one embodiment, shown with reference to FIGS. 6, 10 and 11, spring-loaded lock 220 may include an actuator 222 (FIG. 6 only) slidably coupled to body 210. FIG. 6 shows a cross-sectional view with spring loaded lock 220 in a locked position, FIG. 10 shows side, partial cross-sectional view of body 210 and FIG. 11 shows a plan view of lock member 226. Actuator 222 may include any manually engageable member that is movable to activate/deactivate a lock member 226, e.g., a rod, knob, handle, etc. As illustrated in FIGS. 6 and 10, body 210 may include a vertical opening 224 in which actuator 222 is slidably positioned. Actuator 222 is coupled to a lock member 226 that may also be slidably positioned in body 210, e.g., in a corresponding lock member slot 228 in body 210. Actuator 222 may be coupled to lock member 226 in any manner, e.g., a threaded connection, welding, etc. Lock member 226 may have any shape necessary to ensure sliding motion relative to body 210 and easy engagement with portion 216 of interior surface 218 of dovetail slot 212 that allows temporary axial fixation of tool mount 202 in dovetail slot 212. Again, portion 216 of interior surface 218 of dovetail slot 212 that lock member 226 engages can vary widely depending on the dovetail slot employed. In the example shown, dovetail slot 212 includes a pair of opposing radially extending grooves into which lock member 226 would extend in a locked position, shown in FIG. 6, thus axially fixing tool mount 202 in dovetail slot 212. In one embodiment, as shown in FIG. 11, lock member 226 may include angled ends 227 to assist in directing it into the locked position, e.g., into radial grooves in the slot.

Figure 9:
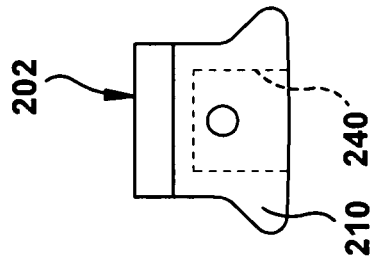
FIG. 9 shows an enlarged end view of a tool mount of the tool of FIGS. 5-7.

Spring-loaded lock 220 may also include a spring 230 (FIG. 6) biasing actuator 222 and lock member 226 to the locked position in which lock member 226 engages, as shown in FIG. 8, portion 216 of interior surface 218 of dovetail slot 212 and fixedly positions body 210 relative to dovetail slot 212. In the example shown, spring 230 biases actuator 222 and lock member 226 radially outward such that lock member 226 moves radially outward into the portion 216 (FIG. 8) of the interior surface in dovetail slot 212. As readily understood, actuator 222 is movable to an unlocked position against the bias of spring 230 in which lock member 226 is disengaged (radially inward in example shown) from portion 216 against the bias of the spring. In the unlocked position, lock member 226 is disengaged from portion 216, and in a position to allow sliding removal of body 210 from dovetail slot 212, e.g., by movement into the confines of an exterior surface of body 210. A size of body 210 and/or position of lock member 226 and lock member slot 228 therein may be modified depending on the size of dovetail slot 212 and a location of portion 216 therein. In addition a set of tool mounts 202 with different bodies 210 and/or lock member 226 positions may be provided so tool 200 can be employed with a wide variety of turbomachine types and sizes. Further, in an optional embodiment, as shown in FIGS. 9 and 10, body 210 may have an at least partially hollow interior 240 to reduce a weight thereof for ease of handling. As shown in FIG. 6, tool mount 202 may optionally include a handle 242 coupled to body 210 for ease of handling. Handle 242 may be coupled to body 210 in any fashion, e.g., a threaded connection (shown), welding, etc. While spring 230 has been illustrated as a coil spring positioned about actuator 222, it can take a variety of alternative forms such as but not limited to a leaf spring, etc., and need not extend about the actuator.

As shown in FIGS. 6-7 and 9, tool mount 202 may also include a pin seat 246 in body 210 to pivotally receive a transverse pin 248 of an intermediate pivot 252 of lever arm 204, as will be described in greater detail herein.

With reference to FIGS. 5-7 and 12, lever arm 204 may include a first portion 250, an intermediate pivot 252 for pivotally engaging tool mount 202, and a second portion 254 for engaging NFPS member 130. As illustrated first portion 250 may be angled relative to second portion 254 such that leverage can be gained in operation and/or provide clearance to turbomachine 100 parts. Lever arm 204 may also optionally include a third portion 256 intermediate first and second portions 252, 254 and angled relative to both, to provide additional leverage and/or to provide clearance for NFPS member 130, as shown in FIG. 7. Third portion 256 may not be necessary in all instances. Intermediate pivot 252 may be positioned on third portion 252, when provided or merely between first and second portions 252, 254 when it is not provided. The angles used between portions can be set to any required for the particular turbomachine 100 (FIG. 1) and/or to provide necessary leverage and/or clearance.

In one embodiment, intermediate pivot 252 includes transverse pin 248 extending from lever arm 204. As noted, transverse pin 248 seats in pin seat 246 in body 210 of tool mount 204 such that pin 248 is pivotally received therein. Transverse pin 248 may extend from both sides of lever arm 204 or just one side, and may be coupled to lever arm in any manner, e.g., welding, brazing, etc.

Figure 12:
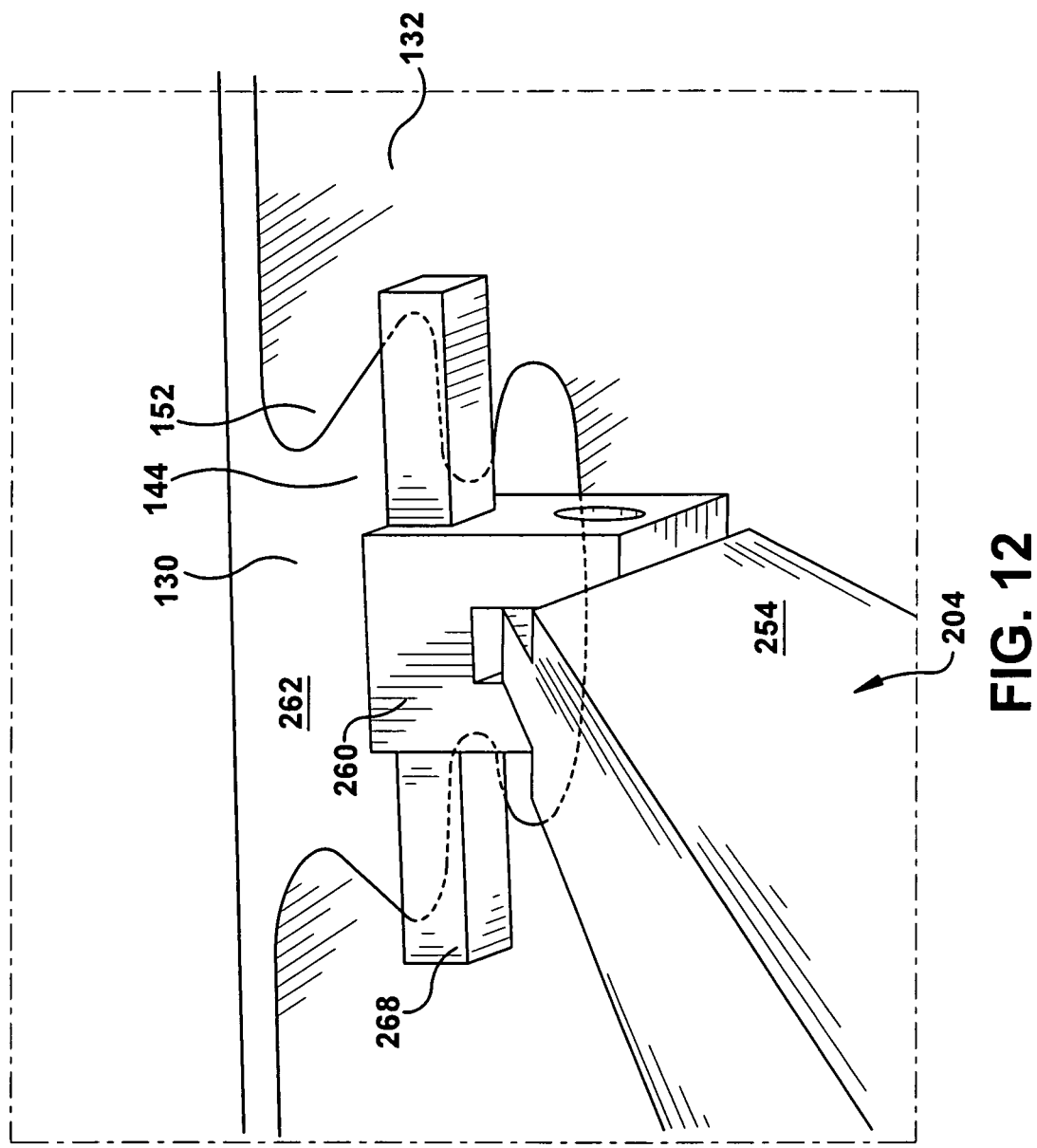
FIG. 12 shows an enlarged perspective view of a pusher member of the tool of FIGS. 5-7.

As shown in FIGS. 6, 7 and 12, lever arm second portion 254 may optionally include a pusher member 260 configured to engage an axial face 262 (FIG. 12 only) of NFPS member 130 (turbine component). Pusher member 260 may be pivotally coupled to second portion 254, e.g., by a pivot pin 264 (FIG. 6), but this may not be necessary in all instances. Where pivoting is provided, pusher member 260 may pivot freely (FIG. 5) or may be locked in position in any fashion, e.g., using a set screw 266 (FIG. 6). In one embodiment, as shown best in FIG. 12, pusher member 260 may have a dimension configured to prevent movement of the pusher member into dovetail slot 152, and prevent pushing NFPS member 130 too far into the dovetail slot. For example, pusher member 260 may have a circumferential and/or radial extent 268 preventing pusher member 260 from entering dovetail slot 152.

Lever arm first portion 250 can be a bare metal, e.g., steel. In alternative embodiments, lever arm first portion 250 may include a handle 270 for engaging by a user, e.g., a rubber coating or other ergonomic handle, and/or a hammer block 272 fastened thereto, e.g., of steel or other hard material, to allow hammering of first portion 250.

In operation, tool 200 can be used to install a wide variety of turbomachine components, such as NFPS member 130, in a dovetail slot 152 of a first component mount 132 (seal member rotor wheel). In a first step, shown in FIGS. 4 and 6, a turbomachine component such as NFPS member 130 is partially positioned in dovetail slot 152, i.e., in its seal member rotor wheel 132 component mount. Either prior to the first step or thereafter, tool mount 202 is affixed to dovetail slot 212 of mount rotor wheel 214 adjacent to seal member rotor wheel 132 (component mount). Lever arm 204 is then pivotally engaged with tool mount 202, e.g., by placing transverse pin 248 of intermediate pivot 252 into pin seat 246. As is evident from FIG. 7, lever arm 204 may need to be manipulated about NFPS member 130 in order to be properly engaged with tool mount 202. As lever arm 204 is engaged with tool mount 202, lever arm second portion 254, e.g., via pusher member 260, engages NFPS member 130 as it is partially positioned in dovetail slot 152. Actuating lever arm 204 against tool mount 202 causes second portion 254 of the lever arm to install NFPS member 130 into dovetail slot 152 of seal member rotor wheel 132. That is, as lever arm 204 is moved away from seal member rotor wheel 132, second portion 254 pushes NFPS member 130 into dovetail slot 152. Tool 200 provides a mechanism to smoothly install NFPS member 130 regardless of whether a C-shaped seal 154 (FIG. 4) is present in dovetail slot 152. Actuating lever arm 204 may occur by a user simply pulling first portion 250 of lever arm 204, or may be assisted by more extreme force application, e.g., by hammering, on first portion 250 and/or a hammer block 272 thereof (if provided). Once a NFPS member 130 has been installed, tool 200 can be removed and re-used on a next NFPS member 130.

Tool 200 can be made of steel or any other structurally strong metal capable of withstanding the forces applied thereto.

Tool 200 allows for installation of difficult to install turbomachine components with a high degree of feel and fidelity. Tool 200 is ergonomic, lightweight and easy to use compared to conventional processes, making installation safer and quicker. In addition, the two piece arrangement provides full installation functionality in tight locations without damage to component hardware and can be used during manufacture or in the field. Tool 200 can also be scaled to handle a wide variety of turbomachine types and sizes.

The foregoing drawings show some of the operational processing associated according to several embodiments of this disclosure. It should be noted that in some alternative implementations, the acts described may occur out of the order described or may in fact be executed substantially concurrently or in the reverse order, depending upon the act involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A tool for installing a turbomachine component in a first dovetail slot of a first component mount, the tool comprising:
    a tool mount having a body for selective fixing in a second dovetail slot of a second component mount adjacent to the first component mount; and
    a lever arm including:
        a first portion,
        a second portion positioned opposite the first portion, the second portion angled relative to the first portion,
        a third portion positioned between the first portion and the second portion, the third portion angled relative to both the first portion and the second portion, and
        an intermediate pivot positioned on the third portion, adjacent the first portion, the intermediate pivot for pivotally engaging the tool mount,
    wherein actuating the lever arm against the tool mount causes the second portion of the lever arm to engage and install the turbomachine component into the first dovetail slot of the first component mount.

2. The tool of claim 1, wherein the body has a cross-section configured to mate with at least a portion of the second dovetail slot.

3. The tool of claim 1, wherein the body has an at least partially hollow interior.

4. The tool of claim 1, wherein the tool mount further includes a spring-loaded lock configured to engage a portion of an interior surface of the second dovetail slot to temporarily fix a position of the tool mount to the second dovetail slot.

5. The tool of claim 4, wherein the spring-loaded lock includes:
    an actuator slidably coupled to the body;
    a lock member slidably positioned in the body and coupled to the actuator; and
    a spring biasing the actuator and the lock member to a locked position,
    wherein the lock member is configured to:
        engage the portion of the interior surface of the second dovetail slot and fixedly positions the body relative to the second dovetail slot in a locked position, and
        disengage from the portion against the bias of the spring, allowing removal of the body from the second dovetail slot in an unlocked position.

6. The tool of claim 1, wherein the tool mount includes a handle coupled to the body.

7. The tool of claim 1, wherein the second portion includes a pusher member configured to engage an axial face of the turbomachine component.

8. The tool of claim 7, wherein the pusher member has a dimension configured to prevent movement of the pusher member into the first dovetail slot.

9. The tool of claim 7, wherein the pusher member is pivotally coupled to the lever arm.

10. The tool of claim 1, wherein the first portion includes at least one of a handle for engaging by a user and a hammer block.

11. The tool of claim 1, wherein the intermediate pivot includes a transverse pin extending from the lever arm, and the tool mount includes a pin seat in the body to pivotally receive the transverse pin.

12. The tool of claim 1, wherein the turbomachine component includes a near flow path seal (NFPS) member and the first component mount includes a rotor wheel.

13. A tool for installing a near flow path seal (NFPS) member in a first dovetail slot of a first rotor wheel, the tool comprising:
    a tool mount having a body for selective fixing in a second dovetail slot of a second rotor wheel adjacent to the first rotor wheel; and
    a lever arm including:
        a first portion, a second portion positioned opposite the first portion, the second portion angled relative to the first portion, a third portion positioned between the first portion and the second portion, the third portion angled relative to both the first portion and the second portion, and an intermediate pivot positioned on the third portion, adjacent the first portion, the intermediate pivot for pivotally engaging the tool mount, wherein actuating the lever arm against the tool mount causes the second portion of the lever arm to engage and install the NFPS member into the first dovetail slot of the first rotor wheel.

14. The tool of claim 13, wherein the tool mount further includes a spring-loaded lock configured to engage a portion of an interior surface of the second dovetail slot to temporarily fix a position of the tool mount to the second dovetail slot.

15. The tool of claim 13, wherein the second portion includes a pusher member configured to engage an axial face of the NFPS member, wherein the pusher member has a dimension configured to prevent movement of the pusher member into the first dovetail slot, and is pivotally coupled to the lever arm.

16. The tool of claim 13, wherein the intermediate pivot includes a transverse pin extending from the lever arm, and the tool mount includes a pin seat in the body to pivotally receive the transverse pin.

17. The tool of claim 14, wherein the spring-loaded lock includes:

an actuator slidably coupled to the body;

a lock member slidably positioned in the body and coupled to the actuator; and a spring biasing the actuator and the lock member to a locked position, wherein the lock member is configured to:

engage the portion of the interior surface of the second dovetail slot and fixedly positions the body relative to the second dovetail slot in a locked position, and disengage from the portion against the bias of the spring, allowing removal of the body from the second dovetail slot in an unlocked position.

\* \* \* \* \*